United States Patent [19]

Taylor et al.

[11] 4,404,454
[45] Sep. 13, 1983

[54] LIGHT ENERGY PERFORATION APPARATUS AND SYSTEM

[75] Inventors: George W. B. Taylor, Richmond, Va.; Richard B. Barber, Ann Arbor, Mich.

[73] Assignee: Philip Morris Incorporated, New York, N.Y.

[21] Appl. No.: 350,275

[22] Filed: Feb. 19, 1982

Related U.S. Application Data

[63] Continuation of Ser. No. 944,081, Sep. 20, 1978, abandoned.

[51] Int. Cl.$^3$ .............................................. B23K 27/00
[52] U.S. Cl. .................... 219/121 LK; 219/121 LR; 219/121 LT; 219/121 LV
[58] Field of Search ............... 219/121 LK, 121 LL, 219/121 LP, 121 LQ, 121 LR, 121 LS, 121 LT, 121 LU, 121 LV; 350/266, 273, 274, 275, 285; 356/323-325, 434, 447

[56] References Cited

U.S. PATENT DOCUMENTS

| | | | |
|---|---|---|---|
| 1,328,571 | 10/1931 | Langmuir | 88/16 |
| 2,012,352 | 8/1935 | Rustin et al. | 88/16 |
| 2,494,440 | 1/1950 | Haynes | 88/14 |
| 2,547,623 | 4/1951 | Cockrell | 346/33 |
| 2,589,414 | 3/1952 | Martin et al. | 88/14 |
| 2,844,648 | 7/1958 | Rosenthal | 178/7.1 |
| 2,875,017 | 2/1959 | Reynolds | 346/109 |
| 2,930,669 | 3/1960 | Licklider | 346/109 |
| 3,022,704 | 2/1962 | Cary | 88/14 |
| 3,024,365 | 3/1962 | Smith et al. | 250/201 |
| 3,106,642 | 10/1963 | Shapiro | 250/83.3 |
| 3,226,527 | 12/1965 | Harding | 219/121 L X |
| 3,256,524 | 6/1966 | Stauffer | 346/76 L |
| 3,281,712 | 10/1966 | Koester | 331/94.5 |
| 3,303,739 | 2/1967 | Chitayat | 250/233 X |
| 3,325,819 | 6/1967 | Fraser | 346/76 L |
| 3,463,898 | 8/1969 | Takaoka et al. | 219/121 L |
| 3,537,306 | 11/1970 | Bedinger | 356/434 X |
| 3,543,183 | 11/1970 | Heimann | 250/233 X |
| 3,622,740 | 11/1971 | Ravussin et al. | 219/121 L |
| 3,658,422 | 4/1972 | Wilkinson | 356/323 X |
| 3,787,121 | 1/1974 | Lowy et al. | 250/233 X |
| 3,819,277 | 6/1974 | Berthelot et al. | 250/233 X |
| 3,901,601 | 8/1975 | Lahmann | 350/285 X |
| 3,934,073 | 1/1976 | Ardezzone | 219/121 LT X |
| 3,965,327 | 6/1976 | Ehlscheid et al. | 219/121 |
| 3,985,420 | 10/1976 | Grose | 350/7 |
| 3,993,402 | 11/1976 | Fredrick, Jr. | 350/285 |
| 4,079,230 | 3/1978 | Miyauchi et al. | 219/121 LW |
| 4,083,629 | 11/1978 | Kocher et al. | 350/285 |
| 4,118,619 | 10/1978 | McArthur et al. | 350/274 X |
| 4,121,595 | 10/1978 | Heitmann et al. | 219/121 L X |
| 4,153,369 | 5/1979 | Kallet et al. | 356/324 |
| 4,218,606 | 8/1980 | Whitman | 219/121 L |

FOREIGN PATENT DOCUMENTS

| | | |
|---|---|---|
| 2348025 | 4/1974 | Fed. Rep. of Germany . |
| 2379992 | 9/1978 | France . |
| 2410446 | 6/1979 | France . |
| 925798 | 5/1963 | United Kingdom . |
| 1368819 | 10/1974 | United Kingdom . |
| 1400016 | 7/1975 | United Kingdom . |
| 1455327 | 11/1976 | United Kingdom . |

OTHER PUBLICATIONS

Kremen, "Prism Deflector for Laser Machining", *IBM Tech. Disc. Bull.*, vol. 8, No. 6, Nov. 1965, p. 882.

*Primary Examiner*—C. L. Albritton

[57] ABSTRACT

Apparatus for generating pulsed light beams from a focused continuous laser beam includes reflector discs which are rotated about a common rotational axis. The discs include peripheral reflective facets which confront the laser beam in the course of rotation and also have light transmissive portions between adjacent facets. The facets and transmissive portions of successive discs are selectively misaligned such that pulsed beams issue successively from different discs. A system employing the apparatus for perforation of a web also includes a common lens per disc pair and a prism for deviating light issuing from one disc of the disc pair.

9 Claims, 7 Drawing Figures

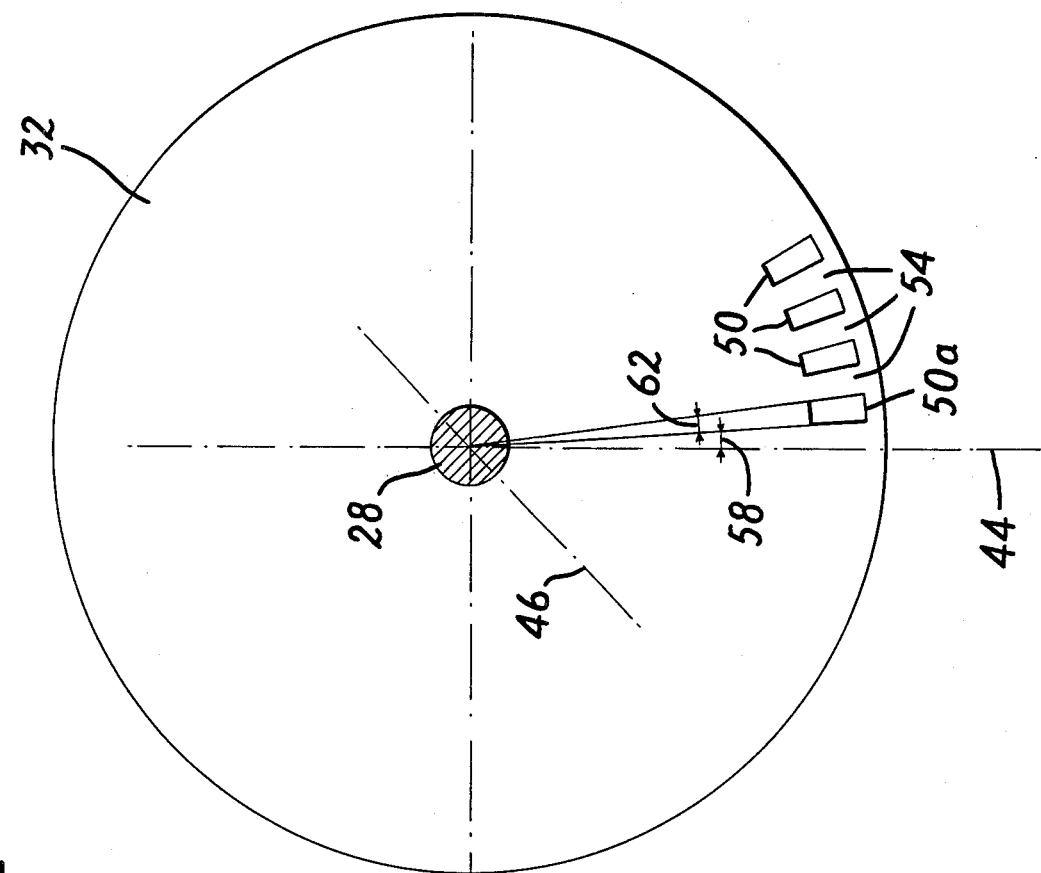
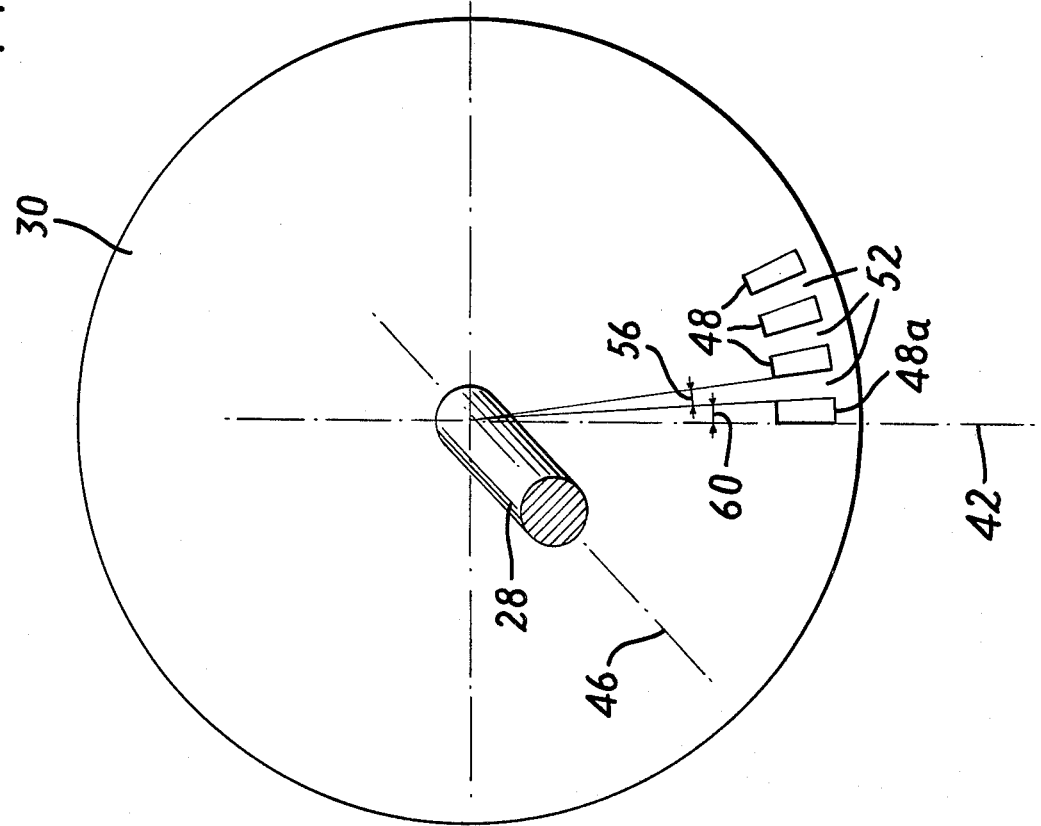
FIG. 2

LIGHT ENERGY PERFORATION APPARATUS AND SYSTEM

This is a continuation, of application Ser. No. 944,081, filed Sept. 20, 1978 now abandoned.

FIELD OF THE INVENTION

This invention relates generally to performing material by the use of light energy and pertains more particularly to apparatus and systems providing spatially precise matrices of perforations in sheet material.

BACKGROUND OF THE INVENTION

In perforating sheet material, a two-dimensional hole matrix is frequently sought with rigorous limits on perforation spacing uniformity as between rows and columns of the matrix. An illustrative field of current interest is that of perforating cigarette filter tipping paper, where hole matrix uniformity enables consistency of cigarette dilution characteristics. In various known mechanical puncture and electric arc perforating practices, row spacing is rendered precise by providing an individual perforating device for each row. Uniformity in the spacing of perforations made in each row, and hence precise column spacing is achieved by synchronizing operation of each perforating device. Since the perforating devices, e.g., pin or electrode pair, are physically limited in size, these practices can readily accommodate quite close spacing of adjacent rows of the matrix.

The prior art has also encompassed perforating practices involving lasers providing pulsed or continuous light energy in row-column perforation. In these efforts, however, there generally has been an apparent preference, for economic and physical size reasons, for use of a single laser serving both row and column perforation. Known single laser practices of type affording spacing uniformity have involved the splitting of the laser beam into plural beams, one for each row, and the focusing of light onto a sheet member by use of an individual lens for each row. Spacing of perforations by precise limits within each row has been sought by inclusion of a movable reflective element in each of the plural beam paths. Complexity attends precision movement, e.g., vibration or pivoting, of such reflective element into and out of its reference plane, to uniformly locate holes in rows, and the present state of the art is accordingly limited.

The foregoing prior art practices and references illustrating same and other practices are further discussed in the statement filed herein pursuant to 37 CFR 1.97 and 1.98.

SUMMARY OF THE INVENTION

The present invention has, as its primary object, the provision of improved apparatus and systems for perforating sheet material by the use of light energy.

A more particular object of the invention is to provide for expeditious perforation of cigarette filter tipping paper by laser.

In attaining these and other objects, the invention provides apparatus for generating pulsed light beams from a continuous light beam, the apparatus including a lens for focusing the continuous beam and one or more light reflective devices supported for rotation and having a plurality of light reflectors disposed in a circular locus and mutually spaced by light transmissive portions. In the course of rotation, the reflectors confront the focused beam whereby light pulses are issued. The reflectors of one such reflective device are aligned with light transmissive portions of other participating reflective devices, and vice versa, such that the light pulses issue successively, or in other pattern, from the participating reflective devices.

In perforating systems of the invention, light pulses issuing from each pair of participating reflective devices are received by a common focusing lens, with a prism or like light deviating member disposed between one of the devices and such common focusing lens to provide for adjacent rows of uniformly spaced perforations in a web or like perforatable member.

The foregoing and other objects and features of the invention will be further understood from the following detailed description of preferred methods and systems and from the drawings wherein like reference numerals identify like parts throughout.

DESCRIPTION OF THE DRAWINGS

FIG. 2 is a perspective view of the reflective discs of FIG. 1, the discs being shown side-by-side for purposes of explanation.

DESCRIPTION OF PREFERRED METHODS AND EMBODIMENTS

Figure 1:
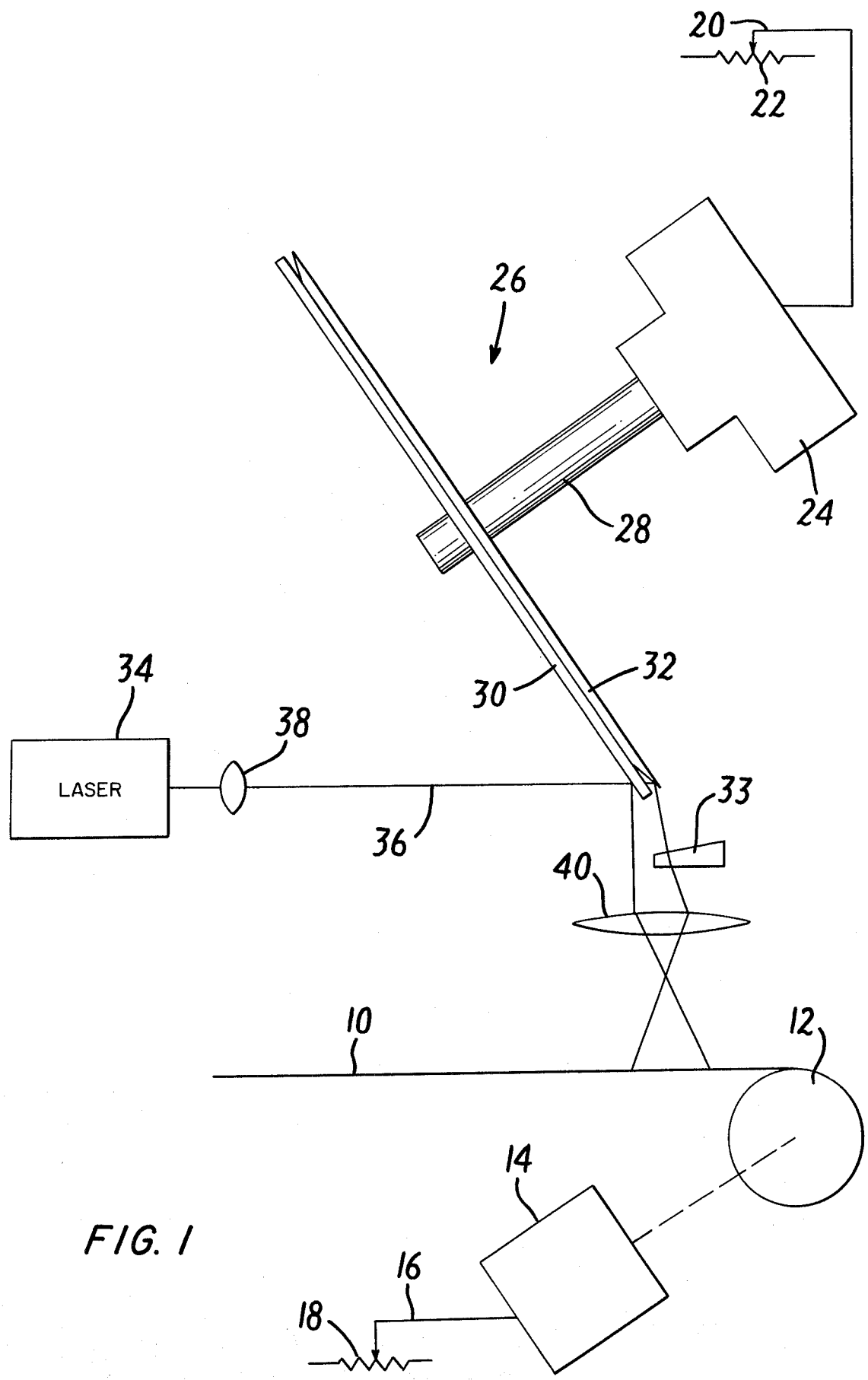
FIG. 1 is a block diagrammatic showing of a preferred system embodiment.

Referring to FIG. 1, a web 10 of sheet material is collected by take-up drum 12 following horizontal transport from a payout drum, not shown. Take-up drum 12 is rotated by drive unit 14 with drum speed being established by a control signal provided on line 18 as furnished by potentiometer 18 or like settable device. A further control signal, derived on line 20 from potentiometer 22 controls drive unit 24 of light-reflector assembly 26, which comprises shaft 28, rotated by drive unit 24 and light-reflective discs 30 and 32 keyed to shaft 28 for rotation therewith.

Laser 34 generates a continuous output beam 36 which is focused by lens 38 at a location adjacent discs 30 and 32. Light beams reflected by the discs are conducted by a common focusing element, shown as lens 40, to web 10.

FIG. 2 shows in side-by-side perspective disc 30 and disc 32, as the latter would be seen rightwardly of disc 30 in FIG. 1. The discs are keyed to shaft 28 in position wherein lines 42 and 44 are in a common plane with shaft axis 46. In the illustrative embodiment wherein two discs are used and are intended to confront beam 36 (FIG. 1) alternately, the discs have light-transmissive uniformly spaced peripheral portions 48 and 50 which are mutually staggered, defining reflective facets 52 and 54 therebetween. Forty-five such facets are typically employed with each facet subtending four degrees of arc (angles 56 and 58) and each transmissive portion also subtending four degrees of arc (angles 60 and 62).

With transmissive portion 48a having its leading edge aligned with line 42 and transmissive portion 50a spaced from line 44 by facet angle 58, the discs are properly aligned for alternate reflection of the laser beam, the beam passing through transmissive portion 48a to be reflected by the facet clockwise of transmissive portion 50a. The light-transmissive portions are typically openings in the discs of size sufficient to freely pass the laser beam. While disc 32 might be constructed with no light-transmissive portions since it is the last disc from the laser, the described construction mitigates against spurious reflection of the laser output beam by disc 32 during confrontation of facets of disc 30 with the laser beam, i.e., laser output beam spillage beyond disc 30 simply passes through disc 32 openings. In this respect, such beam spillage may be desired in applications wherein different spacing lengths are required in adjacent rows and beam usage is not strictly alternate as in the practice under discussion.

Figure 3:
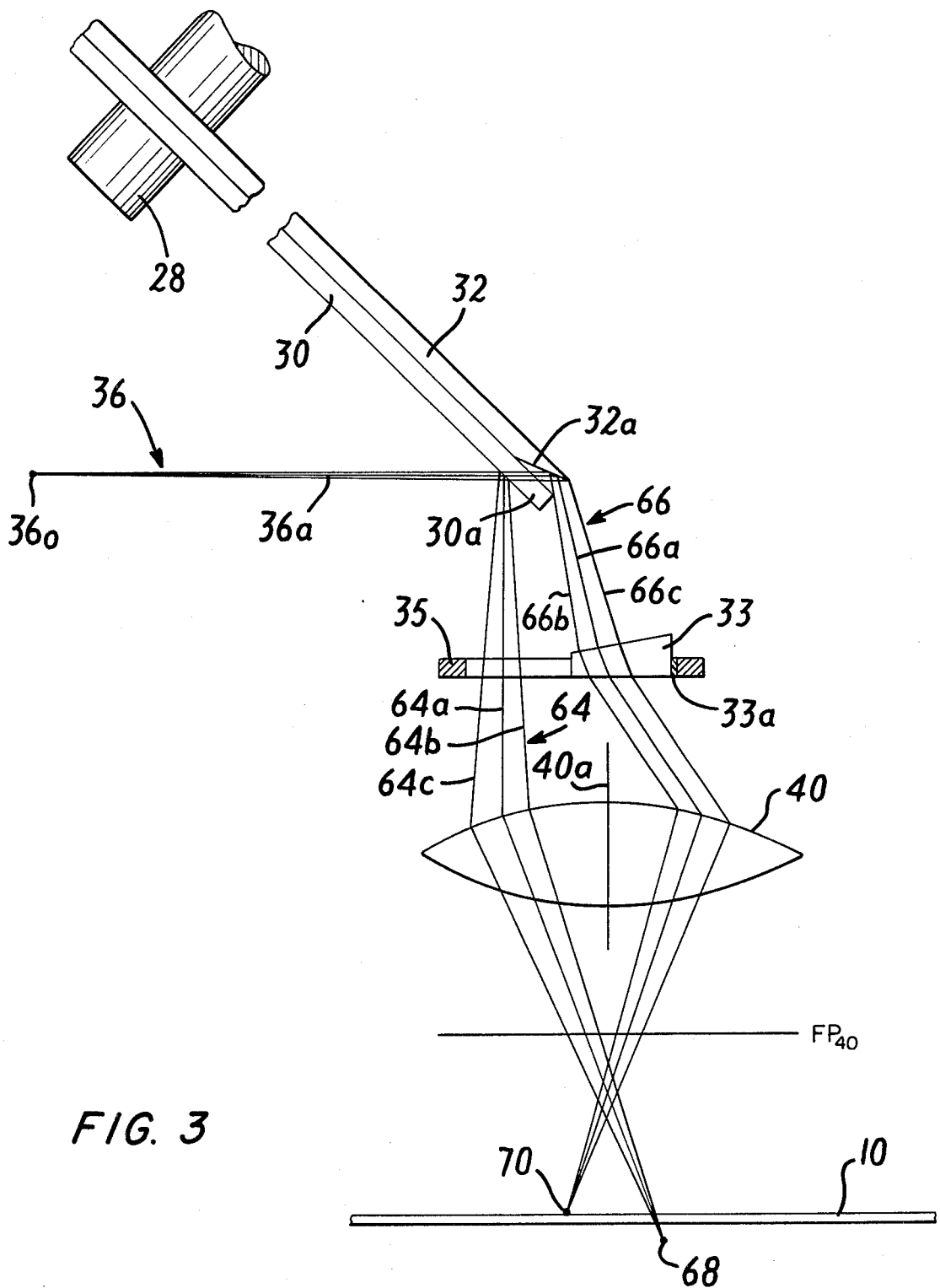
FIG. 3 is an optical diagram applicable to the FIG. 1 system.

Referring to FIG. 3, each confrontation of a facet of disc 30 with beam 36 will give rise to the propagation of a modified version of the laser output beam, such modified beam being shown at 64 and having central axis 64a, which is incident on lens 40 at angle set by the selected orientation of disc 30. Beam 64 has outer rays 64b and 64c, which diverge respectively oppositely from beam central axis 64a. Where beam 36 converges and then diverges between discs 30 and 32, the beam is then convergent as to disc 30, and modified beam 64 will be convergent at the outset and then divergent.

Lens 40 also has within its field of view, through prism 33, the facets of disc 32 and hence collects further modified versions of laser output beam 36 on each confrontation of a facet of disc 32 with beam 36. Such further modified beam 66, as it issues from disc 32, has central axis 66a and divergent outer rays 66b and 66c.

System use herein of the apparatus for generation of pulsed light beams involves diverse attitudes for the facets of different discs and the use of intervening optics. Referring to FIG. 3, surface 30a of disc 30 is fully planar across the diameter of the disc. Surface 32a of disc 32 is beveled at the disc periphery. Thus, the facets of disc 30 are each at first identical attitude with respect to the disc rotational axis and the facets of disc 32 are each at second identical attitude, diverse from such first attitude, with respect to such rotational axis.

Beam 64 is collected directly by lens 40 and focused at location 68. Beam 68 is incident on prism 33, and upon deviation by the prism is focused at location 70, both such locations being outward of focal plane $FP_{40}$ of lens 40. In its function, prism 33 confronts beam 66 and modifies the place and angle of incidence of the beam on lens 40, effectively displacing beam incidence place rightwardly in FIG. 3, from that obtaining if beam 66 were directly applied to the lens, and accordingly controlling the position of location 70. For variable control of the position of location 70, the prism is cemented as at 33a to ring 35, which is supported for rotation about the ring axis. Locations 68 and 70 may accordingly be arranged to be in juxtaposition with a plane through which web 10 is conveyed, thereby to affect perforations therein.

Beam axis 36a and shaft 28 are positioned at a common acute angle to the FIG. 3 plane and lens 40 and prism 33 are moved through such angle outwardly of the FIG. 3 plane into registry with discs 30 and 32. Web 10 has a surgical edge coincident with the FIG. 3 plate. Operation of the system then gives rise to a first row of perforations created by modified beam 64 at locations 68 and a second perforation row spaced therefrom and created by modified beam 66 at locations 70. Such practice will be understood further by detailed consideration of an expanded system embodiment, shown and explained in FIGS. 4–7.

Figure 4:
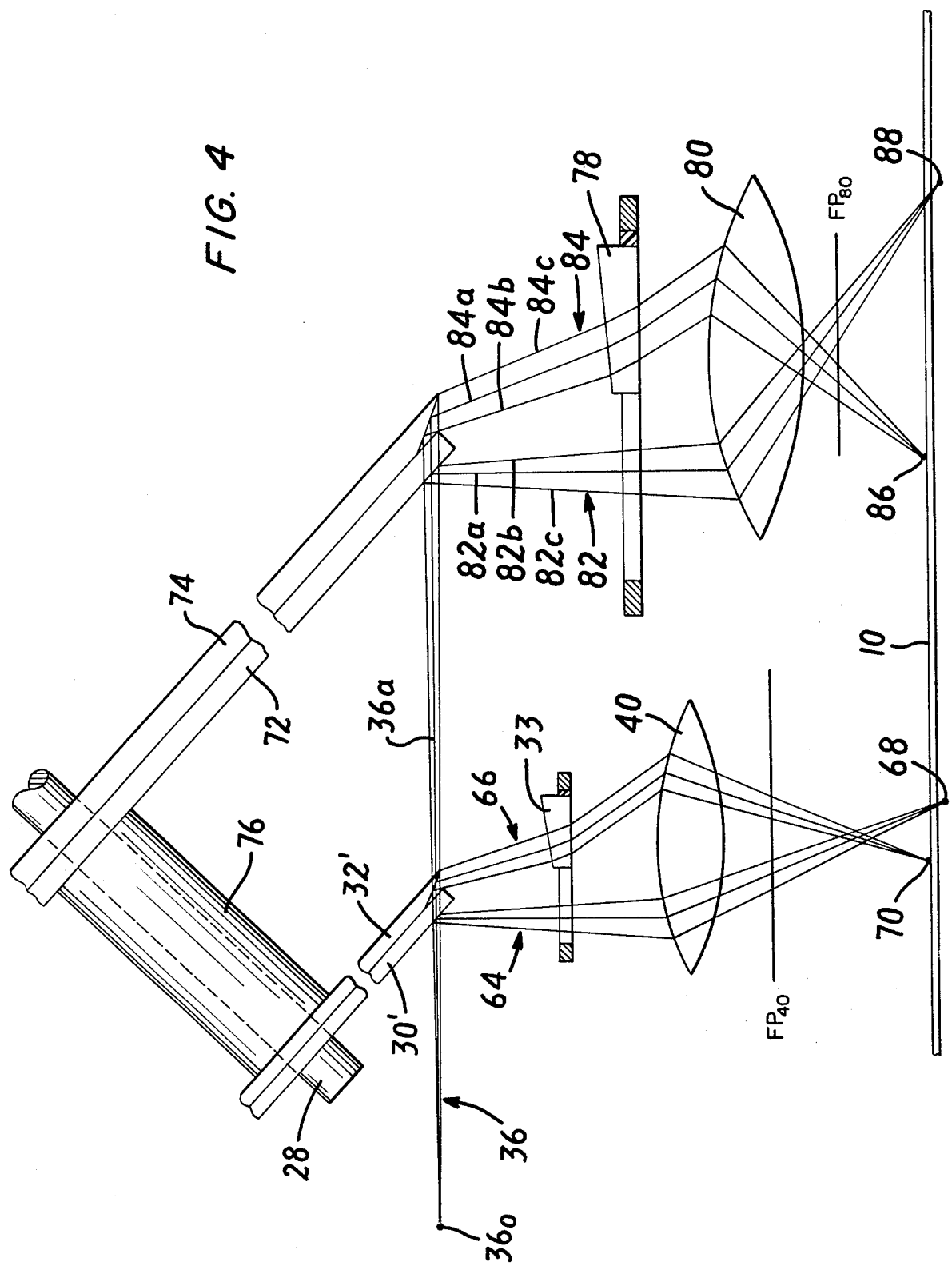
FIG. 4 is an optical diagram applicable to the FIG. 1 system as expanded to include additional reflective discs.

In FIG. 4, four reflective discs, 30', 32', 72 and 74, are spaced along shaft 28 by spacer 76. An additional prism is shown at 78 and a further focusing element for modified beams is shown as lens 80. Modified beams 82 and 84 are propagated respectively by the facets of discs 72 and 74. Modified beam 82 has central axis 82a and outer divergent rays 82b and 82c. Modified beam 84 has central axis 84a and outer divergent rays 84b and 84c.

Discs 72 and 74 have their reflective facets arranged at attitudes to the rotational axis respectively as in the case of discs 30 and 32 discussed above. Lens 80 is positioned closer to web 10 than lens 40, based on the increased extent of divergence of beam 36 as it is confronted by discs 72 and 74. Lens 80 position and prism 78 position are adjusted to provide for disposition of focus locations 86 and 88 of beams 82 and 84 closely adjacent web 10, and generally juxtaposed with locations 68 and 70, as indicated. Spacing $D_1$ exists between locations 68 and 70 based on the selection of facet attitudes of discs 30 and 32 and optics (lens 40 and prism 33) therefor. Spacing $D_2$ between locations 70 and 86 is set by the length of spacer 76. Spacing $D_3$ exists between locations 86 and 88 based on the selection of facet attitudes of discs 72 and 74 and optics (lens 80 and prism 78) therefor.

Figure 5:
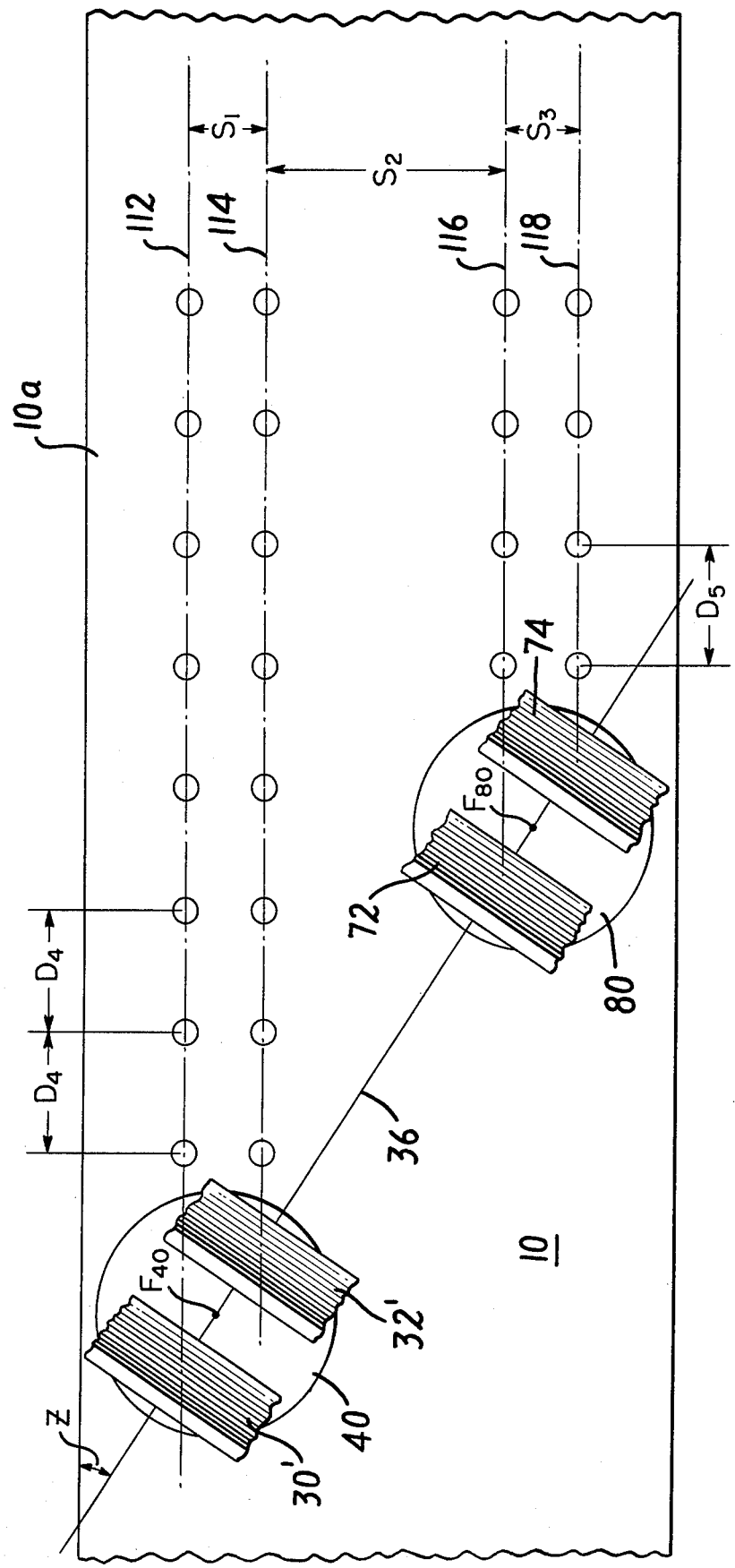
FIG. 5 is a plan elevation of such expanded system.

In FIG. 5, the plane of FIG. 4 is orthogonal to web 10 and coincident with web margin 10a and laser output beam axis 36a makes acute angle Z therewith. The axis of shaft 28 is in a common plane with beam axis 36a orthogonal to web 10. By setting of system parameters as discussed below, the illustrated four row-column matrix may be reached with column spacings $D_4$ and $D_5$ applicable to respective upper and lower adjacent row pairs and spacings $S_1$–$S_3$ applicable as between the rows.

Figure 6:
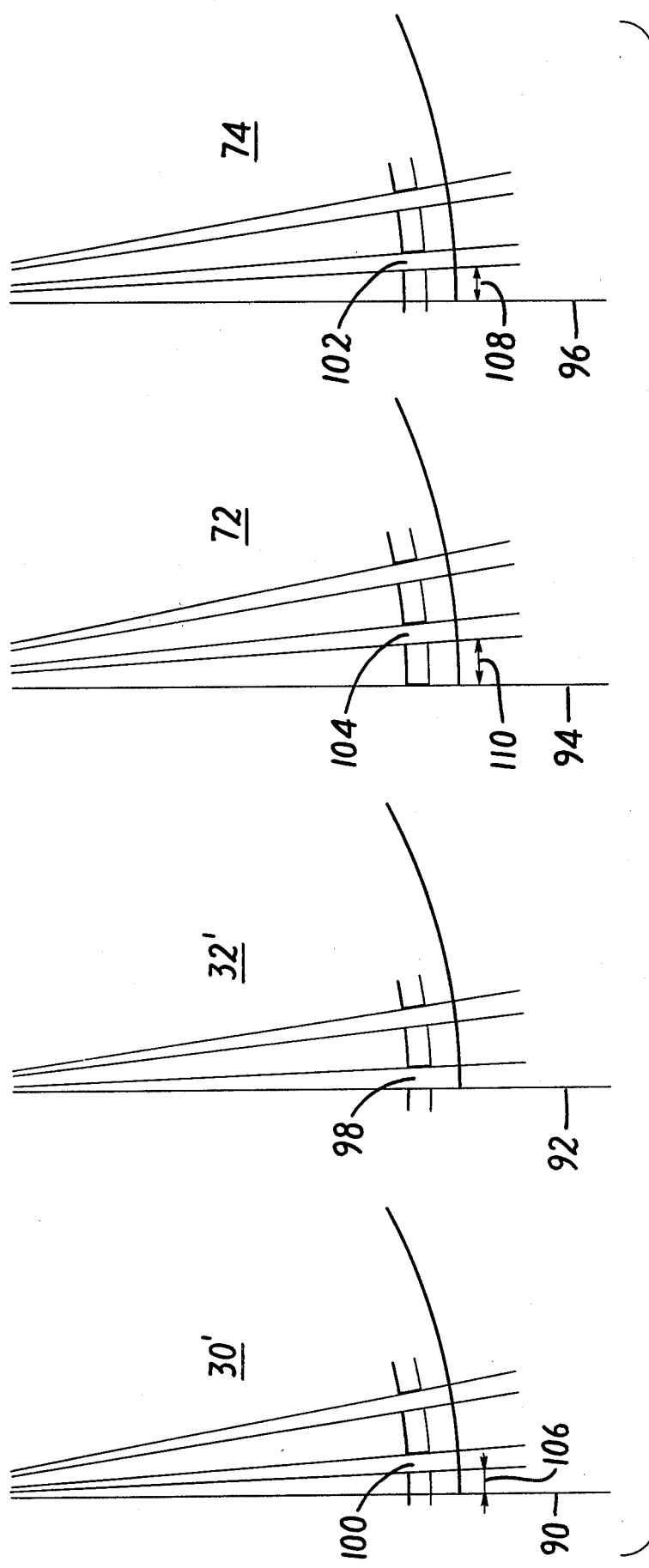
FIG. 6 shows the respective configurations of the reflective discs of the expanded system.

FIG. 6 shows the configuration of discs 30', 32', 72 and 74. With all discs keyed to common plane keying lines 90, 92, 94 and 96, and assuming forty-five facets per disc as in the system of FIGS. 1–3, facets of all discs each subtend two degrees of arc and openings thereof each subtend six degrees of arc. Facet 98 of disc 32' has its leading clockwise edge coincident with keying line 92. Facets 100, 102 and 104 of discs 30', 72 and 74, have their leading clockwise edges spaced from keying lines 90, 94 and 96 respectively by two, six and four degree angles 106, 108 and 110. By this configuration, it will be seen that clockwise rotation of shaft 28 will give rise to successive propagation of modified beams 66, 64, 84 and 82 (FIG. 4). Such firing order is chosen for convenience of explanation since it gives rise to time-successive perforations in rows 112, 114, 116 and 118 of FIG. 5. The firing order can be changed, as desired, from such convenient order. As noted for the two disc embodiment above, the last successive disc may be arranged without light-transmissive portions, but same are preferred to mitigate against spurious light energy reflections from such last disc. The laser beam is focused to its divergence origin $36_o$ (FIG. 4), such that the beam cross-section clears the openings of the penultimate disc (disc 72), thereby assuring that the full beam can be incident on each disc.

Figure 7:
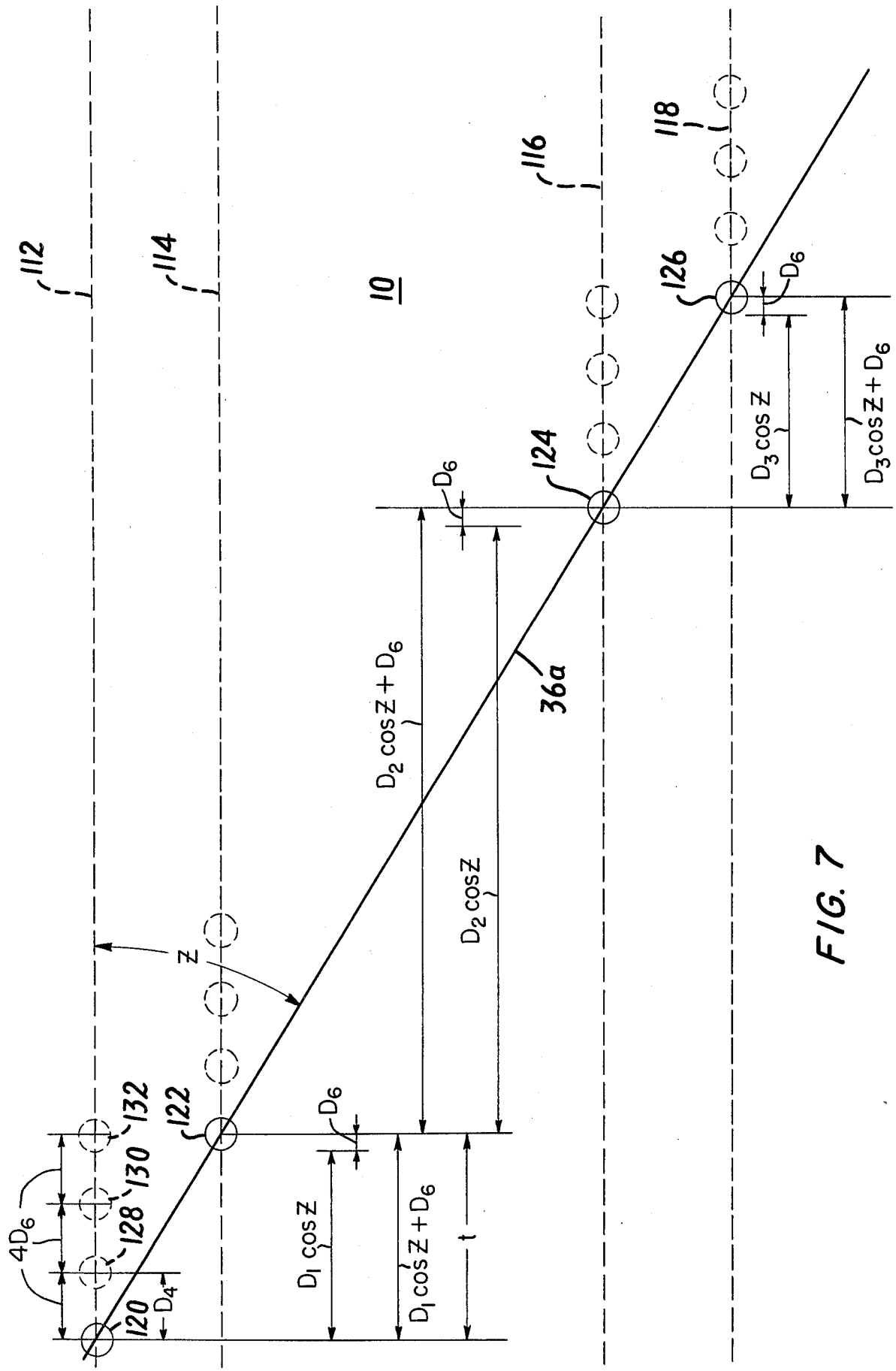
FIG. 7 is a geometric drawing explanatory of perforating activities with the expanded system set as in FIG. 5.

FIG. 7 shows four solid line perforations 120, 122, 124 and 126 made in time succession. The time spacing between each successively made perforation is readily calculated since the propagation rate of modified beams is determined solely by reflector assembly parameters, i.e., for one revolution of shaft 28 in the given embodiment, four times forty-five, or one hundred eighty, modified beams are propagated. The time spacing (t) between successively-made perforations, i.e., perforations 120 and 122, is thus 1/180R, where R is the number of revolutions of shaft 26 per unit time.

Perforations 120 and 122 are spaced in distance by the measure (FIG. 7) $D_1 \cos Z$ plus $D_6$. $D_1$ is the spacing in the FIG. 4 plane between the perforations 120 and 122, with web 10 stationary. The cast image separation of $D_1$ is greater in FIG. 7, based on angle Z and is the measure $D_1 \cos Z$. $D_6$ represents the distance travelled by web 10 during the interperforation time period (t) and is simply web speed (distance travelled per unit time) multiplied by t, derived as above. Since perforations in row 112 are all made at the same location (68-FIG. 4) with respect to lens 40, and do not have cast image spacing, they may all be spaced by a distance ($D_4$) which is shown as being fractional to the spatial measure $D_1 \cos Z$ plus $D_6$, and a multiple of $D_6$ times the number of discs.

In the FIG. 7 example, on rightward movement of web 10, row 112 perforations 128 and 130 are made spatially prior to, and row 112 perforation 132 is made spatially coincident with, row 114 perforation 122, but later in time than row 114 perforation 122. Such phenomena is attributable to the combined effects of case image separation as between time-successive perforations and angle Z.

One may define a number N indicating the number of row 112 perforations made spatially prior (or coincident with) and timewise later than the row 114 perforation made time successive to an initial row 112 perforation, and establish the following relation, for a four disc arrangement:

$$N D_4 = D_1 \cos Z + D_6 \quad (1)$$

$$N = \frac{D_1 \cos Z + D_6}{D_4} \quad (2)$$

or $$D_1 \cos Z = D_4 N - D_6 \quad (3)$$

or $$D_1 = \frac{D_4 N - D_6}{\cos Z} \quad (4)$$

In the given instance, N is three and $D_4$ is four times $D_6$. In such instance:

$$D_1 = \frac{11 D_6}{\cos Z} \quad (5)$$

In expression (4) with $D_1$, Z and N preselected constants, $D_4$ and $D_6$ may be established as mutually variable to affect the same pattern. Since $D_4$ is proportional to t and since $D_6$ is determined by web speed, one may establish a series of respective values for drive unit 24 (reflector assembly speed, line 20 signal of FIG. 1) and drive unit 14 (web transport speed, line 16 of FIG. 1) which will yield the FIG. 7 configuration for rows 112 and 114. A common control input may adjust the wiper positions of pots 18 and 22.

The number N is integral in the foregoing example and is selected as the number three. Any integer may be selected to provide for column perforation registry. Lower values of N, i.e., laser perforations in row 112 between time successive (row 112-row 114) perforations will give rise to a lesser number of perforations per unit distance in web 10. Conversely, higher values of N will increase perforation density in the web.

If N is selected to be non-integral, the above-noted column registration is not provided. By way of example, if N is selected as three and one-half, perforation density as between rows 112 and 114 decreases from the N equals three situation and the perforations in rows 112 and 114 are mutually uniformly staggered, i.e., are 180° out of phase, as is the case with all N values which have a one-half fractional part.

In the N equals three situation above, column registry in rows 116 and 118 also applies, and column registry as among all of rows 112 through 118 may be achieved by making $D_2 \cos Z$ plus $D_6$ an integral multiple of $D_6$ times the number of discs and by making $D_3$ equal to $D_1$. On the other hand, non-uniform matrices may be achieved by other parameter selections however, with consistency of both row spacing uniformity and uniformity in intrarow perforation spacing. The spacing parameters may likewise be modified to compensate for optics aberrations to attain desired perforation matrices.

In its embodiments depicted in the drawings, the apparatus for pulsed beam generation involves plural discs or the like which are disposed mutually contiguously, with facet attitude diversity enabling generation of non-interfering pulsed beam. The apparatus hereof will thus be seen to be changeable in various manners in leading to the generation of pulsed beams. Further, while system usage of the apparatus disclosed herein looks to the use of common focusing of beams issuing from plural discs, individual processing of such beams may be undertaken. As will also be clear, beams in number greater than two may be collected by a common focusing element, giving rise to a corresponding number of perforation rows greater than the two rows obtained in the illustrated practice for each lens. Various modifications in the foregoing apparatus and changes in the described systems may also be introduced without departing from the invention. The particularly disclosed apparatus and system embodiments are thus intended in an illustrative and not in a limiting sense. The true spirit and scope of the invention is set forth in the appended claims.

What is claimed is:

1. Apparatus for generation of pulsed light beams from a continuous light beam for perforating a moving web at certain predetermined spaced-apart locations, comprising:

(a) first reflective means arranged to receive said continuous beam and supported for rotation about a preselected rotational axis, said first reflective means including a first disc (1) having light reflective facets mutually spaced in a circular locus about the periphery of said disc to confront said continuous beam individually in the course of rotation of said first disc, each of said light reflective facets being disposed in a mutually identical first attitude with respect to said rotational axis, and (2) having apertures between adjacent said light reflective facets to define light transmissive portions;

(b) second reflective means disposed mutually contiguously with said first reflective means, said second reflective means including a second reflective disc having light reflective facets mutually spaced in a circular locus about the periphery of said second disc to confront said continuous beam individually in the course of rotation of said second disc, said light reflective facets of said second disc each being disposed in a mutually identical second attitude diverse from said first attitude with respect to said rotational axis, said second disc further having apertures between adjacent said light reflective facets to define light transmissive portions, said light reflective facets and said apertures of said second disc being in alignment respectively with said apertures and said light reflective facets of said first disc, whereby first and second pulsed light beams issue successively alternately from said first and second discs, said diverse dispositions of said light reflective facets on said first and second discs cooperating to cause divergence of the paths of said first and said second pulsed beams;

(c) common focusing means for receiving said first and second pulsed light beams issuing from said first and second discs and focusing said pulsed beams at first and second predetermined spaced-apart locations on said moving web; and (d) light deviating means disposed between said second disc and said common focusing means for controlling the path of said second beam to said common focusing means, and thereby controlling the spacing of said second location relative to said first location on said moving web.

2. The apparatus claimed in claim 1 wherein all said facets are planar elements disposed coplanar with said discs.

3. The apparatus claimed in claim 1 wherein said discs are supported for rotation about a rotational axis intersecting the axis of said focused continuous beam.

4. The apparatus claimed in claim 1 wherein said second disc is supported for joint rotation with said first disc about said rotational axis.

5. The apparatus claimed in claim 1 wherein said light deviating means is movable with respect to said second disc for selective deviation of said second beam path, thereby to adjust the spacing of said second location relative to said first location on said moving web.

6. The apparatus of claim 5 wherein said light deviating means comprises a prism.

7. Apparatus for generation of pulsed light beams from a continuous laser beam for perforating a moving web at certain predetermined spaced-apart locations, comprising:

(a) first reflective means arranged to receive said continuous beam and supported for rotation about a preselected rotational axis, said first reflective means including a first disc (1) having light reflective elements mutually spaced in a circular locus on said disc for confronting said continuous beam individually in the course of rotation of said first disc, each of such light reflective elements being disposed in a mutually identical first attitude with respect to said rotational axis, and (2) having light transmissive portions between adjacent said light reflective elements;

(b) second reflective means disposed mutually contiguously with said first reflective means, said second reflective means including a second reflective disc having a light reflective portion describing a generally circular locus on said second disc for confronting said continuous beam in the course of rotation of said second disc, said light reflective portion of said second disc being disposed in a second attitude diverse from said first attitude with respect to said rotational axis, said light reflective portion of said second disc being in alignment with said light transmissive portions of said first disc, whereby first and second pulsed light beams issue successively alternately from said first and second discs, said diverse attitudes of said light reflective elements on said first disc end of said light reflective portion on said second disc cooperating to cause divergence of the paths of said first and said second pulsed beams;

(c) common focusing means for receiving said first and second pulsed light beams issuing from said first and second discs and focusing said pulsed beams at first and second predetermined spaced-apart locations on said moving web; and (d) light deviating means disposed between said second disc and said common focusing means for controlling the path of said second beam to said common focusing means, and thereby controlling the spacing of said second location relative to said first location on said moving web.

8. The apparatus of claim 7, further comprising:

lens means for receiving said continuous laser beam and issuing a focused continuous beam, wherein said focused continuous beam is received by said first reflective means for confronting said light reflective elements of said first reflective means and by said second reflective means for confronting said light reflective portion of said second reflective means.

9. The apparatus of claim 7, wherein said light reflective portion of said second disc comprises light reflective elements mutually spaced apart, wherein said second disc further includes light transmissive portions between adjacent said light reflective elements, and wherein said light reflective elements and said light transmissive portions of said second disc are respectively aligned with said light transmissive portions and said light reflective elements of said first disc.

* * * * *

UNITED STATES PATENT AND TRADEMARK OFFICE
CERTIFICATE OF CORRECTION

PATENT NO. : 4,404,454

DATED : September 13, 1983

INVENTOR(S) : Taylor et al.

It is certified that error appears in the above-identified patent and that said Letters Patent are hereby corrected as shown below:

Column 1, line 9, "performing" should be -- perforating --.

Column 2, line 44, "18" should be -- 16 --.

Column 3, line 48, "68" (second occurrence) should be -- 66 --.

Column 3, line 67, "surgical" should be -- marginal --.

Column 5, line 32, "case" should be -- cast --.

Page 1, "References Cited", "1,328,571" should be -- 1,828,571 --; "Rustin et al." should be -- Rusting et al. --.

Signed and Sealed this

Twenty-first Day of August 1984

[SEAL]

Attest:

GERALD J. MOSSINGHOFF

Attesting Officer

Commissioner of Patents and Trademarks